(12) United States Patent
Chen

(10) Patent No.: US 7,501,717 B2
(45) Date of Patent: Mar. 10, 2009

(54) APPARATUS AND METHOD FOR DRIVING DIFFERENT FANS

(75) Inventor: Chun-Hsu Chen, Taipei County (TW)

(73) Assignee: Tyan Computer Corporation, Taipei (TW)

(*) Notice: Subject to any disclaimer, the term of this patent is extended or adjusted under 35 U.S.C. 154(b) by 288 days.

(21) Appl. No.: 11/435,729

(22) Filed: May 18, 2006

(65) Prior Publication Data
US 2007/0108923 A1    May 17, 2007

(30) Foreign Application Priority Data
Nov. 16, 2005    (TW) .............................. 94140291 A

(51) Int. Cl.
*H02J 1/00* (2006.01)

(52) U.S. Cl. ........................................................ 307/38
(58) Field of Classification Search .................... 307/38
See application file for complete search history.

(56) References Cited

U.S. PATENT DOCUMENTS 7,355,359 B2 *  4/2008  Kuo ............................ 318/268

* cited by examiner

*Primary Examiner*—Robert L. Deberadinis
(74) *Attorney, Agent, or Firm*—Bacon & Thomas

(57) ABSTRACT

A universal driving apparatus of a computer system inputs two control signals of two different duty cycles through a speed control pin of a receptacle for connecting fans with the electricity supplied continuously. The differentiation percentage of the two speeds is compared with a threshold to identify the fan types. Therefore the computer system is capable of driving the identified fan correctly according to the result of the fan-type identification.

40 Claims, 7 Drawing Sheets

APPARATUS AND METHOD FOR DRIVING DIFFERENT FANS

BACKGROUND OF THE INVENTION

1. Field of Invention

The present invention relates to an apparatus and a method for driving fans, and more particularly, to an apparatus and a method for identifying and driving different fans when coupled to a computer system.

2. Related Art

Currently, various components configured on a mother board would generate heat when operating, especially for those high-performance computing systems. Although some new heat-dissipation systems such as liquid cooling systems are available for specific applications now, conventional fans are still much more common in computers.

Generally, a fan has a power connector for connecting to a receptacle on a mother board, thereby utilizing electricity from a computer system and operating under system control. Two common types of the power connector are for receptacles that have 3 and 4 pins respectively, which are so-called 3-pin fan (as shown in FIG. 5A) and 4-pin fan (as shown in FIG. 5B). The receptacle 410 for the 3-pin fan has a ground pin Jg, a power pin Jp and a speed detection pin Jd, and the one for 4-pin fan has the fourth speed control pin Jc. Correspondingly, the power connector of a 3-pin fan has a ground contact, a power contact and a speed detection contact, while in a 4-pin fan the power connector has an additional speed control contact except the former three ones. Other differences for 3-pin and 4-pin fans are control circuits and control mechanism.

In the prior art, both 3-pin and 4-pin fans receive power (electricity) via the power contacts. To provide corresponding heat-dissipation performances under different system temperatures, the fans need to operate at corresponding speeds controlled by the computer system.

The 4-pin fan has the dedicated speed control contact for speed control, while the 3-pin fan uses the power contact to control speed. Most computer systems input pulse width modulation (PWM) signals to the speed control contact of the 4-pin fan, which is capable of control fan speed without effecting power supply through the power pin. However, for the 3-pin fan, the PWM signal is input to the power switch 420 to control the power switch to remain ON during the time period. Thus, the time period of power inputting through the power contact is controlled. So does the speed of the 3-pin fan.

Comparing to the continuous power supply mechanism of the 4-pin fan, aforesaid intermittent mechanism substantially influences the operation of the 3-pin fan and makes the speed control unstable. Except the duty cycle of the PWM signal is 100%, other duty cycles have a time period that the power switch is OFF, which means the 3-pin fan will be lack of electricity to output speed signals "Tachometer" through the speed detection contact of the power connector and the speed detection pin of the receptacle. Meanwhile, a hardware monitor controller will fail to obtain correct speed from output speed signals. In fact, the difference between the speed obtained by the hardware monitor controller and the real speed of the 3-pin fan could be 2 times. Accordingly, the 3-pin fan cannot reach a given speed responding to a specific system temperature, or remain at the same speed. The system components, consequently, are easily over-heated and damaged. Certainly it is the same for the 3-pin fan.

However, considering cost and system demands, the 3-pin fans are still very useful. For the two types of fans with different specifications and different control mechanisms, no computer system in the prior art is capable of identifying and driving the two fans, neither to provide a interface for both fans.

SUMMARY OF THE INVENTION

To solve the problems mentioned above, the present invention provides a universal apparatus and a universal method for driving different fans that are different from each other about how to control the speed.

In an embodiment of the present invention, an identifying method is provided to identify whether a first fan or a second fan is connected to a receptacle of a computer system. Said receptacle comprises a power pin, a detection pin and a speed control pin. The speed of the first fan is controlled through the speed control pin, while the speed of the second fan is controlled through the power pin. The identifying method comprises the follow steps. First, provide a drive voltage continuously to the power pin of the receptacle according to a power control signal and/or a forced control signal. Next, input a speed control signal with a first duty cycle to the speed control pin of the receptacle. And obtain a first speed form the detection pin of the receptacle. Then, change the speed control signal from the first duty cycle to a second duty cycle. And obtain a second speed from the detection pin of the receptacle. Eventually, identify whether the first fan or the second fan is connected to the receptacle by comparing a differentiation percentage of the first speed and the second speed to a threshold.

The present invention also provides a universal driving method to drive the first fan or the second fan according to the result of the identifying method. When the differentiation percentage of the first speed and the second speed is greater than the threshold, it is the first fan that connects to the receptacle. Then the speed of the first fan will be controlled through the speed control pin. When the differentiation percentage of the first speed and the second speed is smaller than or equal to the threshold, it is the second fan that connects to the receptacle. Then the speed of the second fan will be controlled through the power pin.

In an embodiment of the present invention, a universal driving apparatus is disclosed to drive a first fan or a second fan. The apparatus comprises a receptacle and a power switch. The receptacle is to connect the first fan or the second fan, which further comprises a power pin, a detection pin and a speed control pin. The power pin is for transmitting a drive voltage to the first fan or the second fan, and for controlling the speed of the second fan. The detection pin is for outputting speed signals of the first fan or the second fan. And the speed control pin is for controlling the speed of the first fan according to a speed control signal. The power switch is in circuit connection with the power pin for controlling the drive voltage and transmitting continuously/intermittently to the power pin in accordance with a power control signal and/or a forced control signal.

In an embodiment of the present invention, the power switch is a positive metal-oxide semiconductor (PMOS) switch. The speed control signal may be inverted by the inverter to be the power control signal and control the power switch. The power switch may be forced ON by a buffer driver to provide drive voltage continuously. The inverter may be a negative metal-oxide semiconductor (NMOS). The buffer driver may be controlled by a buffer control signal that is provided by a basic input/output system (BIOS). When the first fan is identified as connecting to the receptacle, the buffer driver lowers the voltage level to force the power switch ON.

When the second fan is identified as connecting to the receptacle, the buffer driver raises the voltage level and fails to control the power switch.

In an embodiment of the present invention, the power switch is a NMOS switch. The voltage of the speed control signal is increased by a level-shift unit to be the power control signal and control the power switch. The power switch may be forced ON by the invert driver for providing the drive voltage continuously. When the first fan is identified as connecting to the receptacle, the invert driver raises the voltage level to force the power switch ON. When the second fan is identified as connecting to the receptacle, the invert driver lowers the voltage level and fails to control the power switch.

In an embodiment of the present invention, the speed control signal is provided by a hardware monitor controller.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
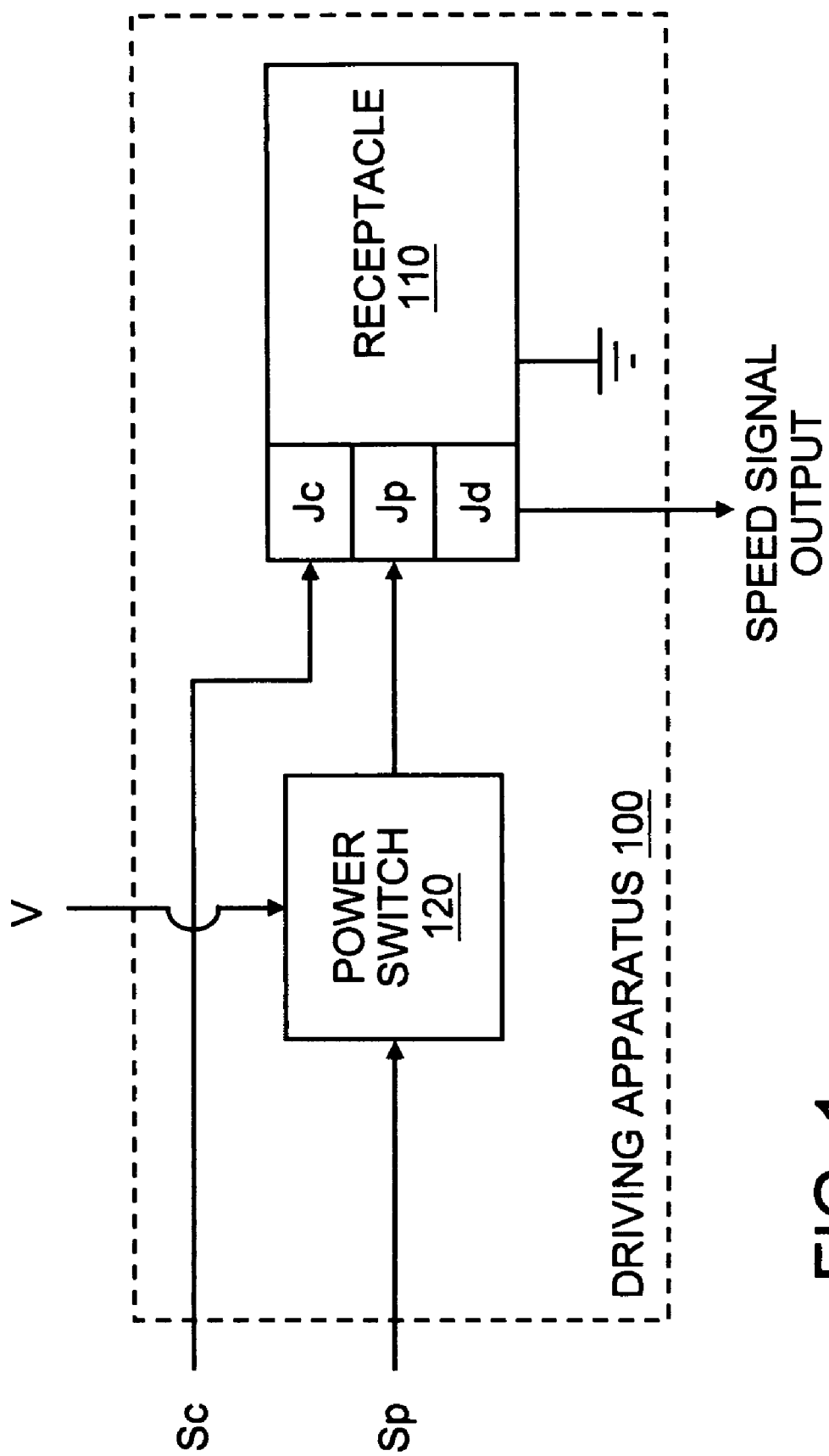
FIG. 1 shows a driving apparatus for different fans according to the present invention.

Please refer to FIG. 1, which illustrates a block diagram of a universal driving apparatus according to an embodiment of the present invention. A driving apparatus 100 mainly comprises a receptacle 110 and a power switch 120, both configured on a mother board of a computer system (not shown) to drive a first fan and a second fan (not shown).

The receptacle 110 is to connect the first fan or the second fan, comprising a power pin Jp, a detection pin Jd and a speed control pin Jc. The arrangement of the pins of the receptacle according to the present invention is responsive to the arrangement of the contacts of the first fan or the second fan, thereby matching and connecting each other to enable the first fan and the second fan to operate normally.

The power connector of the first fan has a first power contact, a first detection contact and a first speed control contact (not shown) configured linearly. The power connector of the second fan also has a second power contact and a second detection contact (not shown), which are configured linearly and corresponding with the contact arrangement of the first fan. The first power contacts of the first fan and the second fan are for power input from the computer system. The first and second detection contacts of the first fan and the second fan are for outputting speed signals while the first speed control contact of the first fan is for inputting speed control signals. The power connectors of the first fan and the second fan have similar specification. One of the differences is that the first fan has the first speed control contact for speed control but the second fan utilizes the second power contact to control speed.

The power pin Jp is to connect the first power contact of the first fan or the second power contact of the second fan. Furthermore the power pin Jp is in circuit connection with the power switch 120 to receive a drive voltage V and transmit to the first power contact of the first fan or the second power contact of the second fan. Except power supply, the second fan has no dedicated contact or other control components for speed control. Therefore, the power pin Jp and the second power contact are also used to control the speed of the second fan.

The detection pin Jd is to connect the first detection contact of the first fan or the second detection contact of the second fan. Generally, the detection pin Jd is in circuit connection with a hardware monitor controller (not shown) and output speed signals from the first detection contact of the first fan or of the second detection contact of the second fan. The hardware monitor controller calculates and record the speeds of the first fan and the second fan for BIOS (not shown) to access.

The speed control pin Jc is for connecting the first speed control contact of the first fan only and for transmitting a speed control signal Sc to the speed of the first fan. In practice, the speed control signal Sc may be a PWM signal from the hardware monitor controller. Or, the speed control signal Sc may be originally generated from the BIOS, transmitting through a general purpose input/output (GPIO) pin of a south bridge chip or a floppy disk controller to be provided to speed control pin Jc.

The power switch 120 is a transistor switch for a power source, connecting to the power pin Jp and providing the drive voltage V to the power pin Jp according to the power control signal Sp continuously or intermittently. Similar to the speed control signal Sc, the power control signal Sp is a PWM signal from the hardware monitor controller, or originally from the BIOS and transmitted to the power switch 120 via the GPIO pin of the south bridge or the floppy disk controller.

The receptacle 110 may have an additional ground pin (the ground symbol shown in FIG. 1. Then the first and second fans should further include a first ground contact and a second ground contact respectively (not shown) to connect the ground pin of the receptacle. As to the pins of the receptacle and the corresponding contacts of the first and second fans, none should be limited by the disclosed types, the numbers, the arrangement sequence or the arrangement types of the pins and the contacts.

Figure 2A:
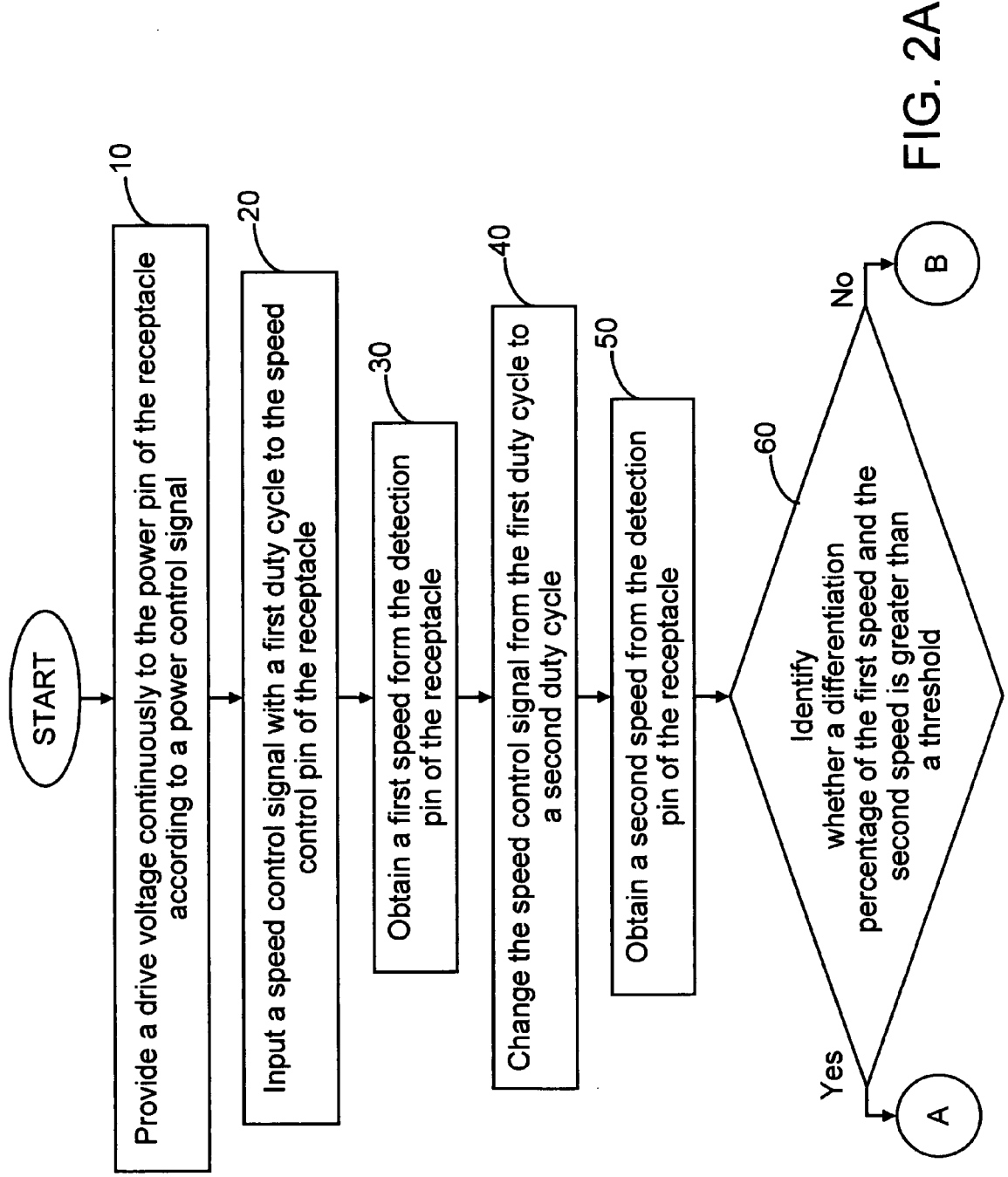
FIGS. 2A and 2B shows a driving method according to the present invention, achieved by applying the driving apparatus in FIG. 1.
Figure 2B:
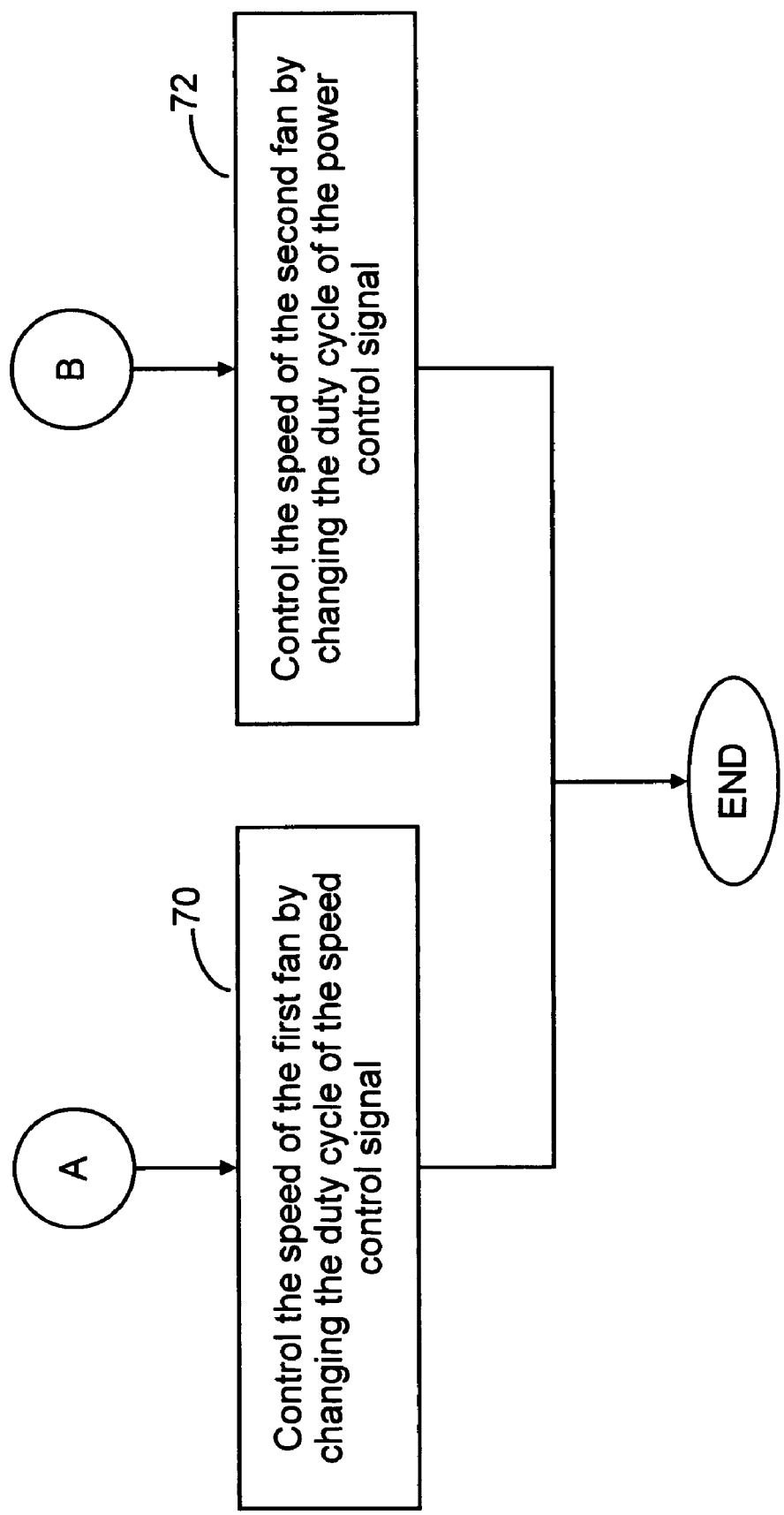

According to the driving apparatus 100 shown in FIG. 1, a universal method for identifying and driving the first fan and the second fan is illustrated in FIGS. 2A and 2B. FIG. 2A shows an identifying method while FIG. 2B shows a driving method for the first fan or the second fan coupled to the receptacle 110. Since the most significant difference between the first fan and the second fan is the way to control fan speed, we can providing the drive voltage V continuously during the whole identifying processes. Then the speed of the second fan will remain the same if the receptacle 110 is coupled by the second fan. Next we can change the duty cycle of the speed control signal Sc. For the second fan, the speed is not influenced by the speed control signal Sc. But the first fan will follow the speed control signal Sc to operate at a certain speed. Therefore, those two fans can be differentiated.

Please refer to FIG. 2A, in step 10, after the first or second fan is coupled to the receptacle 110, the power switch 120 is forced ON due to the power control signal Sc with 100% duty cycle (full duty cycle) and the drive voltage V provided continuously to the power pin Jp of the receptacle 110. As mentioned above, if it is the second fan connected to the receptacle 110, step 10 will fix the speed of the second fan, which is usually the highest speed of the second fan under the control of the power control signal Sp with full duty cycle. In the present embodiment the power control signal Sp is also a PWM signal, which means the power switch 120 is turned ON as long as the duty cycle of the power control signal Sp during a unit time period. Thus, to maintain the providing drive voltage V, the power control signal Sp should remain 100% duty cycle during the whole identifying processes. Continuously providing the drive voltage V can also prevent the second fan from the problems of unstable speed corresponding to a low duty cycle, as the 3-pin fan in the prior art.

Next, in step 20 the speed control signal Sc with a first duty cycle is inputted to the speed control pin Jc of the receptacle 110. And from the detection pin Jd of the receptacle 110, a first speed can be obtained (step 30). Afterwards, in step 40 the speed control signal Sc is changed from the first duty cycle to a second duty cycle. And obtain a second speed from the detection pin Jd of the receptacle 110 (step 50).

Said first and second duty cycles will affect the speed of the first fan. Generally, the difference between the first and second duty cycles should be as great as possible. An optimum will be one of the two duty cycles is 100%. Because the same fan under the same duty cycle could possibly have some speed errors generated by mechanical factors, the measured speed under 100% duty cycle usually has smaller errors. For example, under 100% duty cycle some 3-pin fans have 5% average speed differences.

For those 4-pin fans controlled by the speed control signal Sc may have the similar situation. Therefore, a differentiation percentage ΔDC (ΔDC=|DC1−DC2|) of a first duty cycle DC1 and a second duty cycle DC2 is better to be much greater than a second average speed-differentiation percentage $Y_{AP}$ of the second fan. ($Y_{AP}$ is defined as a average percentage of speed differentiation of the second fan, obtained with reasonable experiments under continuous power supplied to the second fan or under 100% duty cycle of the power control signal Sp.) Thereby, a differentiation percentage $\Delta X_P$ of the first speed and the second speed will be greater enough to differentiate the two fans of two types.

In step 60 the differentiation percentage $\Delta X_P$ of the first speed and the second speed is compared with a predetermined threshold T to identify whether the first fan or the second fan is connected to the receptacle. If the differentiation percentage $\Delta X_P$ of the first speed and the second speed is greater than the threshold T, it is the first fan connected to the receptacle; if $\Delta X_P$ is smaller than or equal to the threshold T, it is the second fan. As to the selection of a proper threshold T, the second average speed-differentiation percentage $Y_{AP}$ of the second fan under continuous power supply can be used as the threshold T. A lead percentage L may be used for slight modification.

Equations (1), (2) and (3) in the following shows the relations between T, $Y_{AP}$, L and $\Delta X_P$.

$$T = Y_{AP} + L; \quad (1)$$

$$\Delta X_{P>T}: \text{the first fan}; \quad (2)$$

$$\Delta X_{P \leq T}: \text{the second fan}; \quad (3)$$

wherein $\Delta X_P$ is the differentiation percentage between the first speed and the second speed of the first fan; T is the threshold; L is the lead percentage; $Y_{AP}$ is the second average speed-differentiation percentage of the second fan under continuous power supply.

As to the selection of the first and second duty cycles and the threshold T, under normal operation of the speed control mechanism, the differentiation percentage $\Delta X_P$ between the first and second speeds of the first fan, will be very close to the differentiation percentage ΔDC of the first and second duty cycles. A possible difference only exists as a first average speed-differentiation percentage $X_{AP}$ of the first fan, which is generated by mechanical factors during operation, as shown in Equation (4).

$$\Delta DC \approx \Delta X_P \pm X_{AP}; \quad (4)$$

Therefore, referring to Equations (1) to (4), the minimum differentiation percentage $\Delta DC_{min}$ of the first and second duty cycles can be set as the sum of the second average speed-differentiation percentage $Y_{AP}$ of the second fan, the lead percentage L and the first average speed-differentiation percentage $X_{AP}$ of the first fan, as shown in Equation (5). That means the differentiation percentage ΔDC of the first and second duty cycles is at least greater than the sum of the second average speed-differentiation percentage $Y_{AP}$, the lead percentage L and the first average speed-differentiation percentage $X_{AP}$. If L=0, threshold T=$Y_{AP}$ and $\Delta DC_{min} = Y_{AP} \pm X_{AP}$, wherein $Y_{AP} + X_{AP} < \Delta DC < 100\%$ should be a selection with acceptable, precise identification.

$$\Delta DC_{min} \approx \Delta X_{Pmin} \pm X_{AP} \approx T \pm X_{AP} \approx Y_{AP} + L \pm X_{AP}; \quad (5)$$

wherein ΔDC is the differentiation percentage of the first and second duty cycles with $\Delta DC_{min}$ as a minimum; $X_{AP}$ is the first average speed-differentiation percentage of the first fan with $\Delta X_{Pmin}$ as its minimum.

Certainly, the selection of the first and second duty cycles and the threshold should not be limited to the Equations mentioned above. However, said Equations provides an estimation of a primary experiment. As a matter of fact, for different producers and fan models, differences of power supply modules and control components, the first and second duty cycles and the threshold may possibly rely on the experiences of engineers very much. In general, a set of the first and second duty cycles and the threshold will be good enough if the difference between the threshold and the differentiation percentage ΔDC of the first and second duty cycles is great enough to differentiate the two fans. The differentiation percentage ΔDC of the first and second duty cycles is in the range of 5% to 99% according to the present invention. Or, the threshold T is acceptable in the range of 1 to 90%. The lead percentage L from 0% to 80% is quite useful to modify for different fans or identification accuracy. For some certain 3-pin and 4-pin fans, 3%-15% of the threshold T is proper enough, while the difference between of the first and second duty cycles may be in the range of 20%-80%.

Please refer to FIG. 2B, after fan-type identification is done, drive the first fan or the second fan according to proper ways. If the differentiation percentage $\Delta X_P$ of the first speed and the second speed is greater than the threshold T, it is the first fan and we need to control the speed of the first fan by changing the duty cycle of the speed control signal Sc (step 70). If the differentiation percentage $\Delta X_P$ of the first speed and the second speed is smaller than or equal to the threshold T, it is the second fan and we need to control the speed of the second fan by changing the duty cycle of the power control signal Sp (step 72).

Figure 3A:
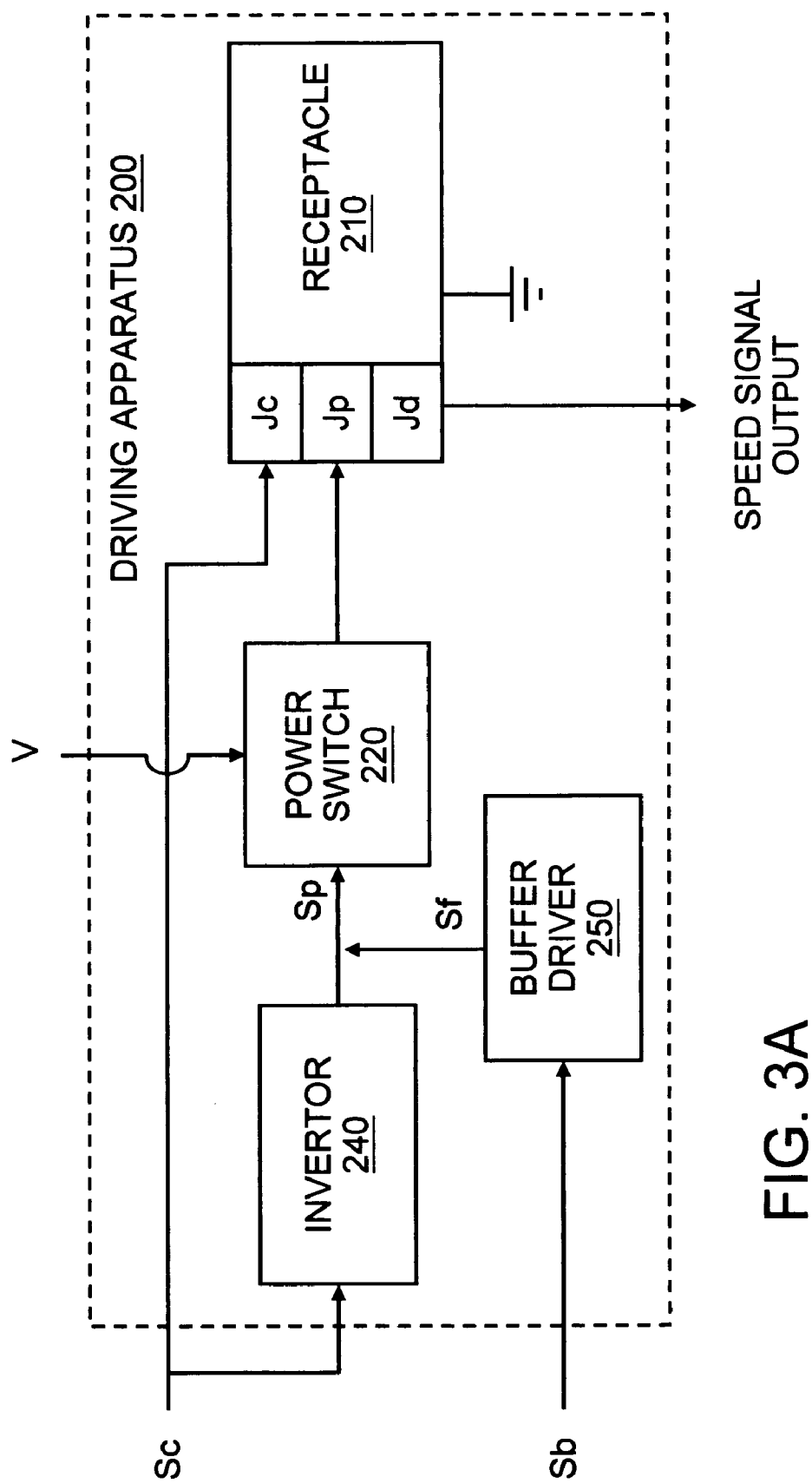
FIG. 3A shows another driving apparatus according to the present invention.

Please refer to FIG. 3A. Another embodiment according to the present invention discloses a driving apparatus 200. One of the major differences between FIGS. 1 and 3A is that the speed control signal Sc is inputted to the power pin and the speed control pin as well in FIG. 3A. Besides, the power control signal Sp is an invert signal of the speed control signal, which means in the present embodiment the speed control signal Sc needs to be inverted to generate the power control signal Sp. The speed control signal Sc is first inverted by a NMOS inverter 240 to become the power control signal Sp and control a PMOS power switch 220 to input the drive voltage V to the power pin Jp of the receptacle 210. Since continuous electricity is necessary during the identifying processes with changeable duty cycles of the speed control signal Sc, a buffer control signal Sb is needed to generate a forced control signal Sf by a buffer driver 250. The forced control signal Sf is capable of forcing the power switch 220 ON during the identifying processes. That is, the identifying method of the present embodiment further comprises a step of translating the voltage level of the buffer control signal Sb to generate the forced control signal Sf. The speed control signal Sc and the buffer control signal Sb may be PWM signals provided by a hardware monitor controller, or may be a speed control signal Sc generated originally from the BIOS by way of a GPIO pin of a south bridge chip or a floppy disk controller. The power control signal Sp is transmitted continuously while the forced control signal Sf is generated only for certain situations to force the power switch 220 ON. In practice, the forced control signal Sf may be a signal through voltage level shift process, such as a signal from the hardware monitor controller or the BIOS transmitted by way of a GPIO pin of a south bridge chip or a floppy disk controller, thereby transmitting to the power switch 220 through the buffer driver or another invert driver. The voltage level of the forced control signal Sf determines the power switch 220 to be ON, or fails to control the power switch 220 and let the power control signal Sc take the control.

In the identifying method, the buffer driver 250 remains the forced control signal Sf at a low voltage level to force the power switch 220 On. When the first fan is identified as connecting to the receptacle 210, the buffer driver 250 will pull down the voltage level to force the power switch 220 ON. That is, according to the present embodiment, the identifying method further comprises a step of translating the voltage level of the buffer control signal Sb to make the forced control signal Sf at a low voltage level for continuously providing drive voltage V when the first fan is identified as connecting to the receptacle 210. In the other hand, if the second fan is identified as connecting to the receptacle 210, the buffer driver 250 raises the voltage level and fails to control the power switch 220. Then the power switch 220 will be directly controlled by the power control signal Sp (or the inverted speed control signal Sc). That is, according to the present embodiment the identifying method further comprises a step of translating the voltage level of the buffer control signal Sb to provide a forced control signal Sf with a high voltage level and fail to control the drive voltage V when the second fan is identified as connecting to the receptacle.

Figure 3B:
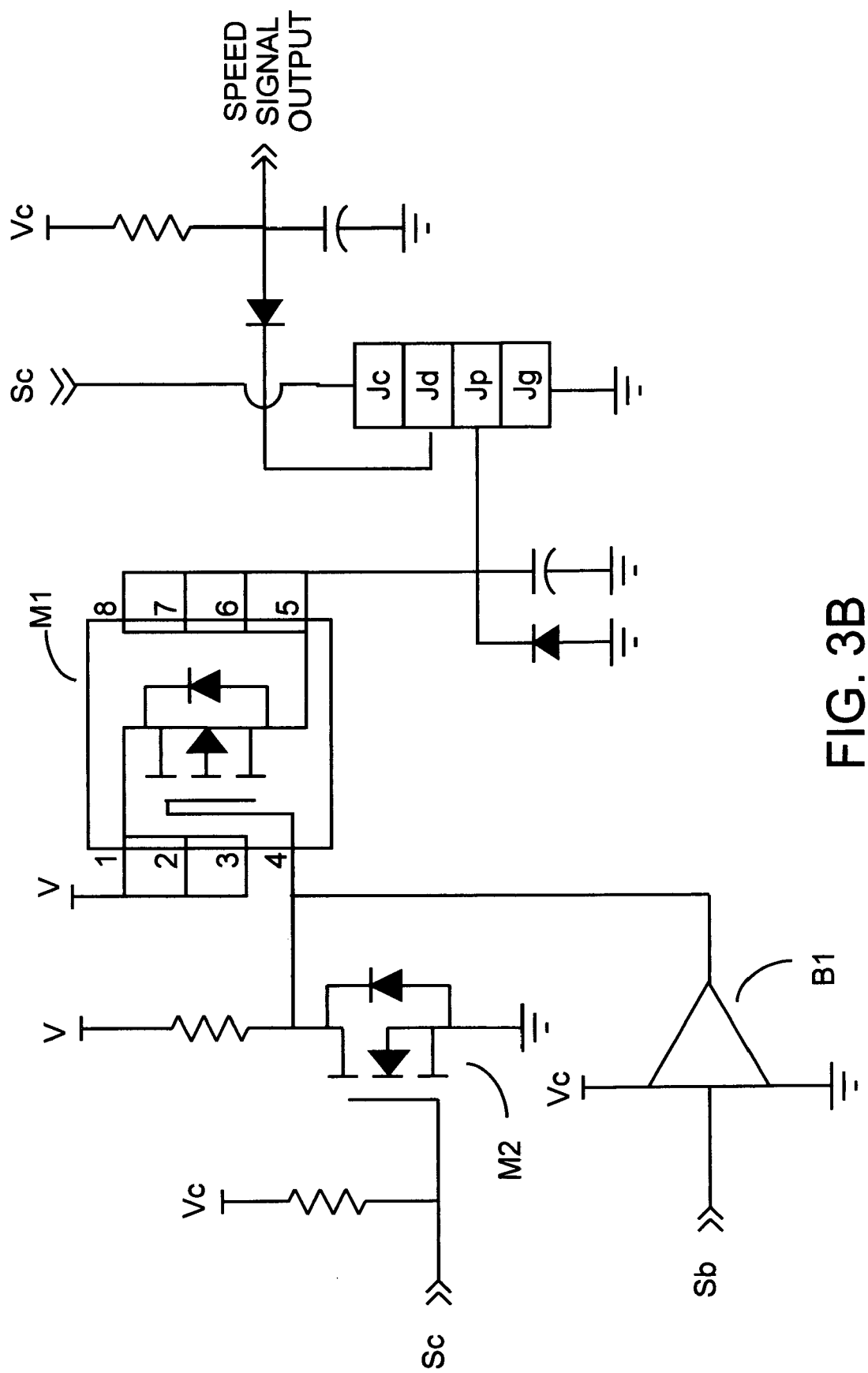
FIG. 3B shows a circuit diagram for realizing the driving apparatus in FIG. 3A.

In FIG. 3B, a circuit diagram for realizing the driving apparatus 200 in FIG. 3A is disclosed; wherein the drive voltage V is 12V; M1 is a PMOS switch for operating as the power switch 220; M2 is an NMOS switch for operating as the inverter 240; B1 is the buffer driver 250 in FIG. 3A; and Vcc is another 5V voltage provided by the mother board of the computer system.

Figure 4:
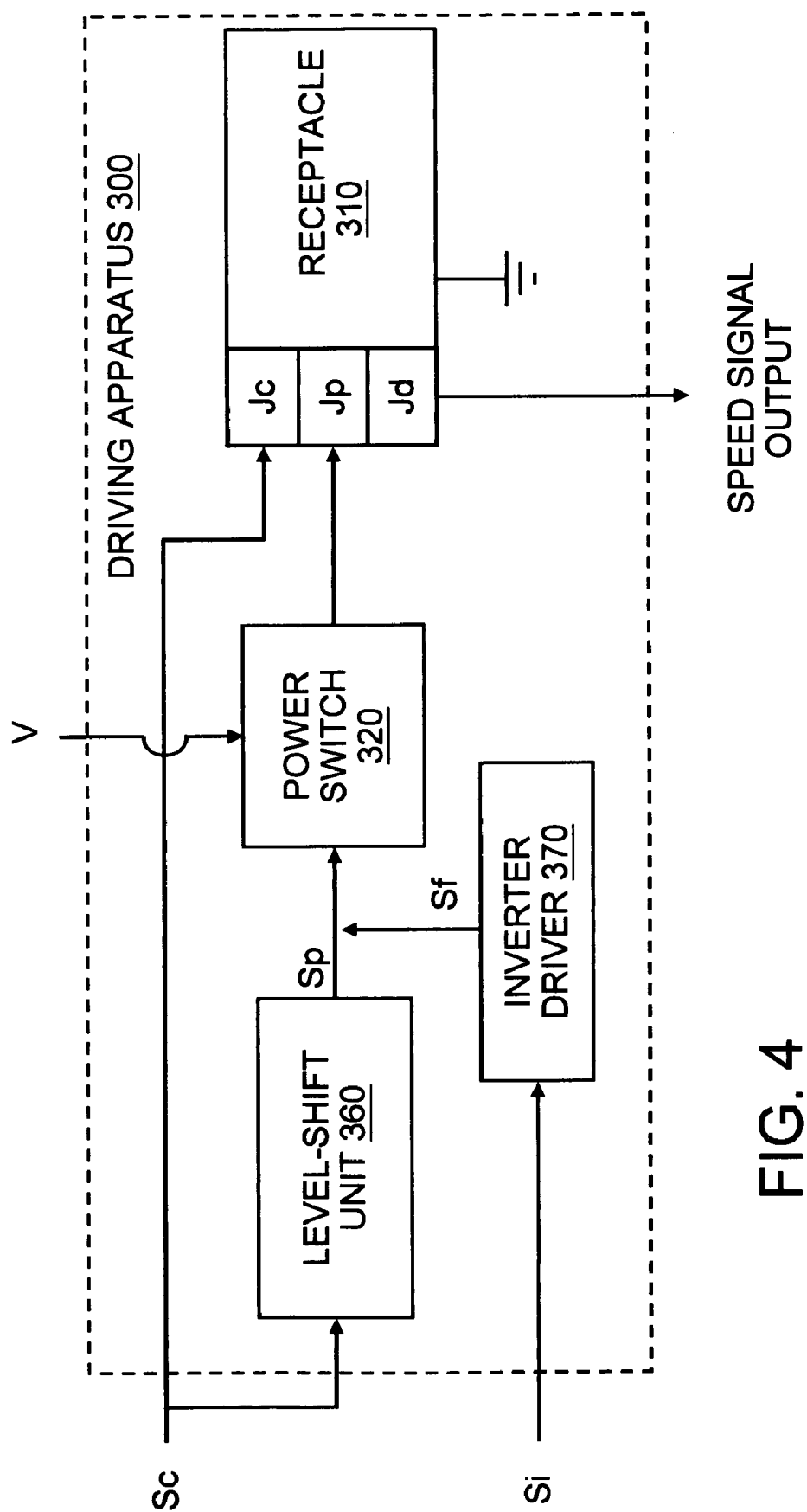
FIG. 4 shows another driving apparatus according to the present invention.
Figure 6:
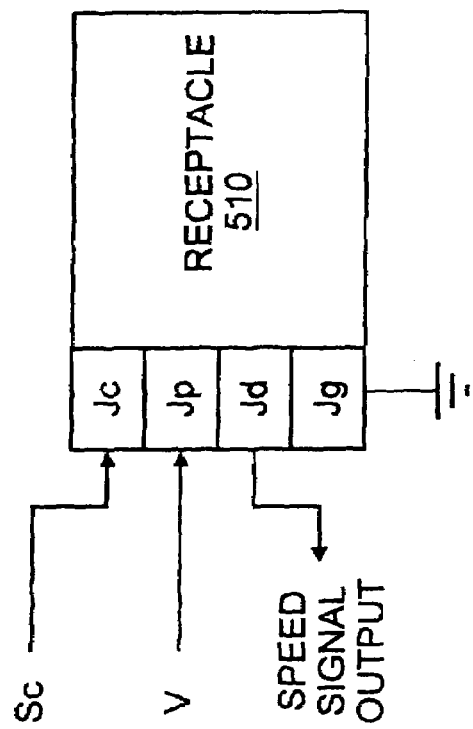
FIGS. 5 and 6 shows driving apparatuses in the prior art.
Figure 5:
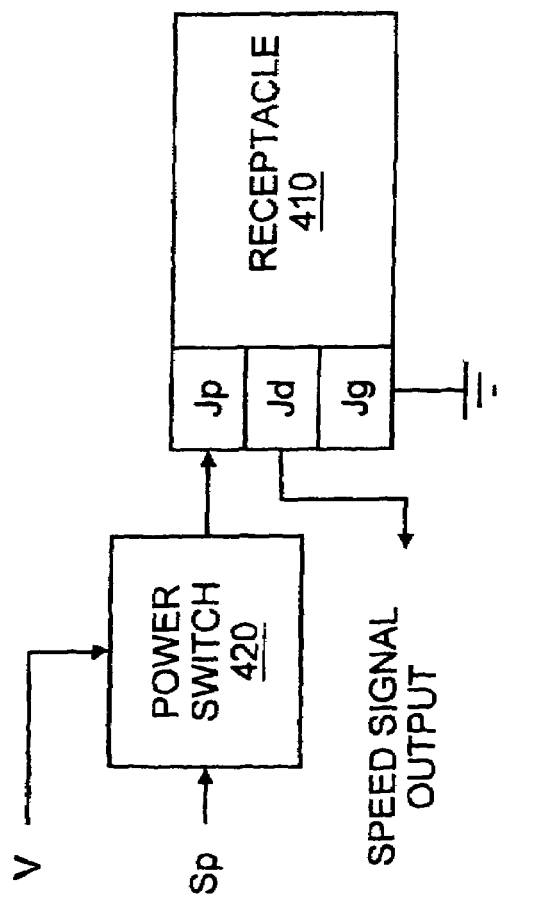

Please refer to FIG. 4. Another embodiment according to the present invention discloses a driving apparatus 300. One of the major differences between FIGS. 4 and 3A is that the power control signal Sp is a non-invert signal of the speed control signal Sc. The voltage of the speed control signal Sc needs to be increased by a level-shift unit 360 to become the power control signal Sp for turning the NMOS power switch 320 ON and inputting the drive voltage V to the power pin Jp of the receptacle 310. That is, according to the present embodiment the identifying method further comprises a step of increasing the voltage of the speed control signal Sc to generate the power control signal Sp. Since continuous electricity is necessary during the identifying processes with changeable duty cycles of the speed control signal Sc, an invert-driving signal Si is used to be processed by a invert driver 370 to generate the forced control signal Sf for forcing the power switch 320 ON. That is, according to the present embodiment, the identifying method further comprises a step of translating the voltage level of the invert-driving signal Si to generate the forced control signal Sf. During the identifying processes, the invert driver 370 remains the forced control signal Sf at a high voltage level to force the power switch 320 ON. if the first fan is identified as connecting to the receptacle 310, the invert driver 370 will still raise the voltage level to force the power switch 320 ON. That is, according to the present embodiment, the identifying method further comprises a step of translating the voltage level of the invert-driving signal Si to provide a forced control signal Sf with a high voltage level for continuously providing the drive voltage V when the first fan is identified as connecting to the receptacle 310. In the other hand, the invert driver 370 lowers the voltage level and fails to control the power switch 320. Then the power switch 320 will be directly controlled by the power control signal Sp (or the speed control signal Sc with increased voltage) if the second fan is identified as connecting to the receptacle 310. That is, according to the present embodiment, the identifying method further comprises a step of translating the voltage level of the invert-driving signal Si to provide the forced control signal Sf with a low voltage level and fail to control the drive voltage V when the second fan is identified as connecting to the receptacle 310. The speed control signal Sc and the invert-driving signal Sb may be PWM signals provided by the hardware monitor controller, or may be originally the speed control signal Sc generated by the BIOS and transmitted by way of a GPIO pin of a south bridge chip or a floppy disk controller.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for identifying whether a first fan or a second fan is connected to a receptacle of a computer system, the receptacle comprising a power pin, a detection pin and a speed control pin, the speed of the first fan being controlled through the speed control pin, and the speed of the second fan being controlled through the power pin, the method comprising the steps of:

providing a drive voltage continuously to the power pin of the receptacle according to a power control signal and/or a forced control signal;

inputting a speed control signal with a first duty cycle to the speed control pin of the receptacle;

obtaining a first speed from the detection pin of the receptacle;

changing the speed control signal from the first duty cycle to a second duty cycle;

obtaining a second speed from the detection pin of the receptacle; and identifying whether the first fan or the second fan is connected to the receptacle by comparing a differentiation percentage of the first speed and the second speed to a threshold.

2. The method of claim 1, wherein the first fan is identified as connecting to the receptacle if the differentiation percentage of the first speed and the second speed exceeds the threshold, and wherein the second fan is identified as connecting to the receptacle if the threshold exceeds the differentiation percentage of the first speed and the second speed.

3. The method of claim 1, wherein the power control signal is an invert signal of the speed control signal.

4. The method of claim 3, further comprising a step of inverting the speed control signal to generate the power control signal.

5. The method of claim 4, further comprising a step of translating the voltage level of a buffer control signal to generate the forced control signal, the buffer control signal being provided by a basic input/output system (BIOS) or a hardware monitor controller of the computer system.

6. The method of claim 5, further comprising a step of translating the voltage level of the buffer control signal to change the forced control signal to low-voltage level and provide the drive voltage continuously if the first fan is identified as connecting to the receptacle.

7. The method of claim 5, further comprising a step of translating the voltage level of the buffer control signal to change the forced control signal to high-voltage level and fail to control the drive voltage if the second fan is identified as connecting to the receptacle.

8. The method of claim 1, wherein the power control signal is a non-invert signal of the speed control signal.

9. The method of claim 8, further comprising a step of increasing the voltage of the speed control signal to generate the power control signal.

10. The method of claim 9, further comprising a step of translating the voltage level of an invert-driving signal to generate the forced control signal, the invert-driving signal being providing by a BIOS or a hardware monitor controller.

11. The method of claim 10, further comprising a step of translating the voltage level of the invert-driving signal to change the forced control signal to high voltage level and provide the drive voltage continuously if the first fan is identified as connecting to the receptacle.

12. The method of claim 10, further comprising a step of translating the voltage level of the invert-driving signal to change the forced control signal to low voltage level and fail to control the drive voltage if the second fan is identified as connecting to the receptacle.

13. The method of claim 1, wherein the speed control signal and the power control signal are pulse width modulation (PWM) signals.

14. The method of claim 1, wherein the threshold is the sum of a second average speed-differentiation percentage the second fan and a lead percentage.

15. The method of claim 14, wherein the threshold equals to the second average speed-differentiation percentage.

16. The method of claim 14, wherein the difference between the first duty cycle and the second duty cycle is smaller than 100% and greater than the threshold.

17. The method of claim 14, wherein the difference between the first duty cycle and the second duty cycle is smaller than 100% and greater than the sum of the threshold and an first average speed-differentiation percentage of the first fan.

18. The method of claim 17, wherein the difference between the first duty cycle and the second duty cycle is smaller than 100% and greater than the sum of the first average speed-differentiation percentage and the second average speed-differentiation percentage.

19. The method of claim 14, wherein the lead percentage is in the range of 0% to 80%.

20. The method of claim 1, wherein one of the first duty cycle and the second duty cycle is 100%.

21. The method of claim 1, wherein the difference between the first duty cycle and the second duty cycle is in the range of 5% to 99%.

22. The method of claim 1, wherein the difference between the first duty cycle and the second duty cycle is in the range of 20% to 80%.

23. The method of claim 1, wherein the threshold is in the range of 1% to 90%.

24. The method of claim 1, wherein the threshold is in the range of 3% to 15%.

25. A universal method for driving the first fan or the second fan according to the result of the identifying method of claim 1, the universal method comprising the steps of: controlling the speed of the first fan through the speed control pin if the differentiation percentage of the first speed and the second speed is greater than the threshold; and controlling the speed of the second fan through the power pin if the differentiation percentage of the first speed and the second speed is smaller than or equal to the threshold.

26. A universal driving apparatus of a computer system for driving a first fan or a second fan, the apparatus comprising:
a receptacle for connecting the first fan or the second fan, the receptacle further comprising a power pin, a detection pin and a speed control pin, the power pin being for transmitting a drive voltage to the first fan or the second fan, and for controlling the speed of the second fan, the detection pin being for outputting speed signals of the first fan or the second fan, and the speed control pin being for controlling the speed of the first fan according to a speed control signal; and
a power switch in circuit connection with the power pin, controlling the drive voltage and transmitting continuously/intermittently to the power pin in accordance with a power control signal and/or a forced control signal;
wherein the first fan has a power connector comprising a first power contact, a first detection contact and a first speed control contact for electrically connecting the power pin, the detection pin and the speed control pin of the receptacle respectively, and wherein the second fan has a power connector comprising a second power contact and a second detection contact for electrically connecting the power pin and the detection pin of the receptacle respectively.

27. The apparatus of claim 26, wherein the receptacle further comprising a ground pin, the first fan comprising a first ground contact for electrically connecting the ground pin, the second fan further comprising a second ground contact for electrically the ground pin.

28. The apparatus of claim 26, wherein the power control signal is an invert signal of the speed control signal.

29. The apparatus of claim 28, wherein the power switch is a PMOS switch and the apparatus further comprising an inverter and a buffer driver in circuit connection with the power switch, the inverter inverting the speed control signal to be the power control signal and control the power switch, and the buffer driver forcing the power switch ON for continuously providing the drive voltage.

30. The apparatus of claim 29, wherein the inverter is an NMOS.

31. The apparatus of claim 29, wherein the buffer driver is controlled by a buffer control signal, the buffer control signal being provided by a BIOS or a hardware monitor controller of the computer system.

32. The apparatus of claim 29, wherein the buffer driver lowers voltage level to force the power switch ON if the first fan is identified as connecting to the receptacle.

33. The apparatus of claim 29, wherein the buffer driver raises voltage level and fails to control the power switch if the second fan is identified as connecting to the receptacle.

34. The apparatus of claim 26, wherein the power control signal is a non-invert signal of the speed control signal.

35. The apparatus of claim 34, wherein the power switch is an NMOS switch and the apparatus further comprising a level-shift unit and an invert driver in circuit connection with the power switch, the level-shift unit increasing the voltage of the speed control signal to be the power control signal and control the power switch, the invert driver forcing the power switch ON and continuously providing the drive voltage.

36. The apparatus of claim 35, wherein the invert driver is controlled by an invert-driving signal, the invert-driving signal being provided by a BIOS or a hardware monitor controller of the computer system.

37. The apparatus of claim 35, wherein the invert driver raises voltage level to force the power switch ON if the first fan is identified as connecting to the receptacle.

38. The apparatus of claim 35, wherein the invert driver lowers voltage level and fails to control the power switch if the second fan is identified as connecting to the receptacle.

39. The apparatus of claim 26, wherein the speed of the first fan or the second fan is obtained by a hardware monitor controller from the detection pin.

40. The apparatus of claim 39, wherein the speed control signal is pro the provided hardware monitor controller.

* * * * *

UNITED STATES PATENT AND TRADEMARK OFFICE
CERTIFICATE OF CORRECTION

PATENT NO.       : 7,501,717 B2                                                    Page 1 of 1
APPLICATION NO.  : 11/435729
DATED            : March 10, 2009
INVENTOR(S)      : Chun-Hsu Chen It is certified that error appears in the above-identified patent and that said Letters Patent is hereby corrected as shown below:

On the Title Page, Item (73)
Please change the assignee listed on the first page of the above-identified patent from
"Tyan Computer Corporation." to -- MITAC International Corp. --.

Signed and Sealed this

Sixth Day of April, 2010

David J. Kappos
*Director of the United States Patent and Trademark Office*